Patented Jan. 26, 1943

2,309,380

UNITED STATES PATENT OFFICE 2,309,380

PROCESS FOR PRODUCING PROTEIN PLASTICS

George H. Brother, Urbana, and Leonard L. McKinney, Champaign, Ill., assignors to Secretary of Agriculture of the United States of America No Drawing. Application January 28, 1938, Serial No. 187,573

4 Claims. (Cl. 106—147)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

An object of our invention is the plasticization of hardened, thermoplastic protein material, so that finished molded pieces of varying degree of rigidity may be made at will.

Another object of our invention is the elimination of water as a necessary plasticizer and the substitution of an agent or agents which will react with the hardened protein, forming first soft thermoplastic material, when heated under pressure, but finally curing to a tough and non-thermoplastic material.

The above objects are accomplished according to our invention by treating a protein material, such as soybean protein and meal, cottonseed meal or protein, linseed meal or protein, zein, gluten, other vegetable protein material or casein from milk with an aldehyde or similar hardening agent, for the period of time and under conditions necessary to produce and carry to completion the hardening, curing, or tanning reaction. Our product, after drying and grinding, is mixed with an agent to react further upon the protein, to produce first a soft, well-plasticized material when heated, but upon further heating, to thermo-set so the material is no longer thermoplastic.

The molding industry has long been searching for a satisfactory thermoplastic molding resin, especially one made with a protein base. The comparatively good strength, transparency, and possible color range of protein plastics, together with the ready availability of the protein at a comparatively low cost, has made this material interesting to the plastics industry for many years. However, up to the present time it has been seriously handicapped by the fact that water has been considered essential for plasticization. This has made the development of a protein resinous molding product practically impossible. By definition we hold the term "protein resinous molding product" to mean a molding resin derived directly from the protein rather than a mixture of protein with other resinous materials where the function of the protein is largely that of a filler.

The only industrially important protein plastic up to this time is casein plastic. This product sold under numerous trade names, such as galalith, aladdinite, ameroid, gala, etc., is made by plasticizing casein with 25–40 percent water, forming into shape desired by heat and pressure and hardening in formaldehyde solution. The finished hardened product is not thermoplastic to any degree. The unhardened plastic contains excess water, which after forming and hardening has to be expelled, causing shrinking and warping. Molded products from such material are rather impractical, although attempts to develop them are to be found. (Kasen, U. S. Patent No. 2,045,471; Van Koch, U. S. Patent No. 2,051,779.)

Our invention relates to improved thermoplastic resinous compositions obtained by the condensation reactions of aldehydes and proteins and the further reactions of polyhydric alcohols, and the like, with the protein-aldehyde compound. For illustration, soybean protein may be digested with 250–300 percent by weight of an aldehyde solution such as formalin, acetaldehyde, propionaldehyde, crotonaldehyde, or the like. It is advantageous, though not essential, to have dissolved in the aldehyde solution 0.4 percent caustic on the protein weight, which is the amount necessary to bring the mixture of protein and aldehyde to an equilibrium pH of about 4.3, close to the iso-electric point of soybean protein. The time of digestion will vary with the temperature maintained, the higher the temperature the shorter time necessary to complete the reaction. It has been found that at room temperature, 20–25° C., digestion for from 15 to 24 hours gives a satisfactory product. The excess aldehyde is removed by any known method, the hardened protein dried at 60–80° C. and atmospheric pressure, to less than 5 percent moisture, as determined by the Bidwell-Sterling method (Avellar de Loureiro, J., J. Assoc. Official Agr. Chem., 21, 645 (1938)). If, instead of digesting with the aldehyde, the protein is continually agitated in a mixer, where it can be at the same time heated to 50–80° C., the aldehyde may be reduced to from 5–40 percent on the dry protein weight. The dry protein-aldehyde is reduced to a fine powder by grinding in any suitable mill, such as a ball mill, and is then thoroughly mixed with 10–30 percent of one of the following agents, or mixtures of any two or more of the same, to produce the molding powder: Polyhydric alcohols, such as ethylene glycol, diethylene glycol, propylene glycol, glycerol, sorbitol, mannitol, and the like; unsaturated alcohols, such as allyl alcohol, furfuryl acohol, and the like; an ether of a polyhydric alcohol, such as methyl ether of ethylene glycol, ethyl ether of ethylene glycol, methyl ether of diethylene glycol, ethyl ether of diethylene glycol, and the like; a nitrile, such as ethylene cyanhydrin and the like, will all serve, singly or in mixtures, to produce the desired reaction with the dry, hardened protein-aldehyde complex.

If color effects are desired, spirit soluble dyestuff may be dissolved in the above agent before it is added to the protein-aldehyde. Also, for opaque and other effects, fillers of various kinds may be mixed in, as may also other plasticizers, particularly of an oily or waxy nature. The protein being already thoroughly hardened, any such material found to be compatible may be incorporated to increase water resistance (for example metallic stearates, especially aluminum stearates), or give some other desired effect.

The molding powder is pressed, preferably in a closed type die heated to 100° C. or above, at a minimum of 2000 pounds per square inch pressure. The molded piece, chilled under pressure in the die, will be found to be pliable, depending upon the amount of polyhydric alcohol or other agent added to the protein-aldehyde. It may be broken up, returned to the die, and remolded satisfactorily, thus demonstrating complete thermoplasticity. If, however, it is heated in an oven at about 100° C. for 15-24 hours, it will be found to be hard and tough, perhaps brittle. If this material is broken up and returned to the die to remold, it will be found that the pieces will no longer flow together; it has thermo-set.

The reaction between the protein-aldehyde and the polyhydric alcohol or other agent, is not understood at the present time. It is known that alcohols of either high specific inductance or unsaturation will react with the protein-aldehyde complex. Our plastic is also rendered much more water resistant by the reaction, the protein-aldehyde showing about 20 percent gain in weight if soaked in distilled water at room temperature over night, the protein-aldehyde-alcohol complex, about 10 percent.

In order to illustrate our invention, the following specific examples are set forth, parts being given by weight:

*Example 1.*—100 parts of soybean protein were thoroughly mixed with a solution of 300 parts 37 percent formaldehyde, 0.4 part sodium hydroxide and allowed to stand for 20 hours at room temperature. The excess solution was then removed and the product dried until the moisture content was reduced to 4.3 percent. The dried protein-formaldehyde was ground in a ball mill for 24 hours. To 100 parts of the dry, finely powdered protein-formaldehyde, 20 parts of ethylene glycol were added and thoroughly worked in by stirring and rubbing. The resulting powder is a protein-aldehyde, thermoplastic molding material that may be molded to shape in the usual means by one skilled in the art.

*Example 2.*—A mixture is made of the following ingredients, compounded as described in Example 1:

| | Parts |
|---|---|
| Soybean protein | 100 |
| Formaldehyde (37%) | 300 |
| Sodium hydroxide | 0.4 |
| Glycerol | 21.3 |

The moisture content of the protein-formaldehyde after drying and grinding was found to be 3.0 percent, instead of 4.3 as in Example 1. It was therefore necessary to increase the amount of the hydroxy reactant, in this case glycerol, accordingly.

*Example 3.*—A mixture is made of the following ingredients, compounded as described in Example 1:

| | Parts |
|---|---|
| Soybean protein | 100 |
| Formaldehyde (37%) | 300 |
| Sodium hydroxide | 0.4 |
| Ethylene glycol | 15 |
| Mono methyl ether of diethylene glycol | 6.6 |

The moisture content of the protein-formaldehyde after drying and grinding was 4.0 percent.

*Example 4.*—A mixture is made of the following ingredients, compounded as described in Example 1:

| | Parts |
|---|---|
| Lactic acid casein | 100 |
| Formaldehyde (30%) | 250 |
| Sodium hydroxide | 0.4 |
| Ethylene glycol | 15 |

The moisture content of the casein-formaldehyde after drying and grinding was 3.0 percent.

*Example 5.*—A mixture is made of the following ingredients, compounded as described in Example 1:

| | Parts |
|---|---|
| Soybean protein | 100 |
| Crotonaldehyde | 180 |
| Water | 20 |
| Sodium hydroxide | 0.4 |
| Ethylene glycol | 20 |

The moisture content of the protein-crotonaldehyde after drying and grinding was 3.0 percent. The molding powder and plastic were colored a dark brown.

*Example 6.*—A mixture is made of the following ingredients, compounded as described in Example 1:

| | Parts |
|---|---|
| Soybean protein | 100 |
| Propionaldehyde | 100 |
| Water | 200 |
| Sodium hydroxide | 0.4 |
| Ethylene glycol | 25 |

The moisture content of the protein-propionaldehyde after drying and grinding was 4.0 percent. The powder and plastic were colored pink to scarlet.

*Example 7.*—100 parts soybean protein was swelled with 100 parts of water. To this was added a solution, containing 10 parts chromium sulfate, 125 parts water, and 2 parts concentrated hydrochloric acid. After digesting 24 hours, the acid was neutralized with sodium bicarbonate, the hardened protein filtered off and dried to 4.0 percent moisture. 18 parts ethylene glycol and 5 parts monomethyl ether of diethylene glycol were added to 100 parts of the dried powder and mixed thoroughly. The compound was pressed and a dark green translucent plastic was obtained.

The above examples are merely illustrative of various means of carrying out our invention, which may be varied widely without departing from the spirit thereof. The small amount of caustic included in every example where the hardening is done by an aldehyde, is given for reasons already stated, but it is to be understood it is not essential and may be dispensed with. We also recognize the fact that it is possible to increase the final plasticity and decrease the water absorption of the plastic by the incorporation of plasticizers, oils, waxes, fatty acids, or salts of fatty acids. These may be merely mixed with the molding powder with which they are compatible, or some sort of side reaction may be effected, such for example as the addition of a fatty acid to one hydroxyl of the polyhydric alcohol.

Our invention provides a simple and economical process whereby thermoplastic protein material may be produced. This material molds readily and comes finished as regards stability, finish, etc., from the die. It is completely thermoplastic so any fins or rejects may be returned to the die and remolded. However, if the material is heated over a period of hours, it becomes thermoset and is no longer thermoplastic.

The expression "essentially hardened protein," as used is held to mean any protein reacted upon by aldehyde, chromium or aluminum salts, tannin or the like, to produce material recognized by those skilled in the art as hardened, tanned, or cured. The expression "polyfunctional alcohol" is held to mean all polyhydric alcohols, all unsaturated alcohols, alcohol ethers, alcohol nitriles, and the like.

Having thus described our invention, what we claim for Letters Patent is:

We claim:

1. An article of manufacture, a thermoplastic moldable protein powder, comprising the reaction product at a pH of 4.1±0.2 of soybean protein with formaldehyde, dried to not more than 5 percent moisture content and plasticized with ethylene glycol.

2. An article of manufacture, a thermoplastic moldable protein powder, comprising the reaction product at a pH of 4.1±0.2 of soybean protein with formaldehyde, dried to not more than 5 percent moisture content and plasticized with glycerol.

3. An article of manufacture, a thermoplastic moldable protein powder, comprising the reaction product at a pH of 4.1±0.2 of soybean protein with formaldehyde, dried to not more than 5 percent moisture content and plasticized with ethylene cyanhydrin.

4. An article of manufacture, a thermoplastic moldable protein powder, comprising the reaction product at a pH of 4.6±0.2 of milk casein with formaldehyde, dried to not more than 5 percent moisture content and plasticized with ethylene glycol.

GEORGE H. BROTHER.
LEONARD L. McKINNEY.